June 13, 1950          E. CRAIG          2,511,329
LENS SHIELD
Filed Dec. 26, 1946
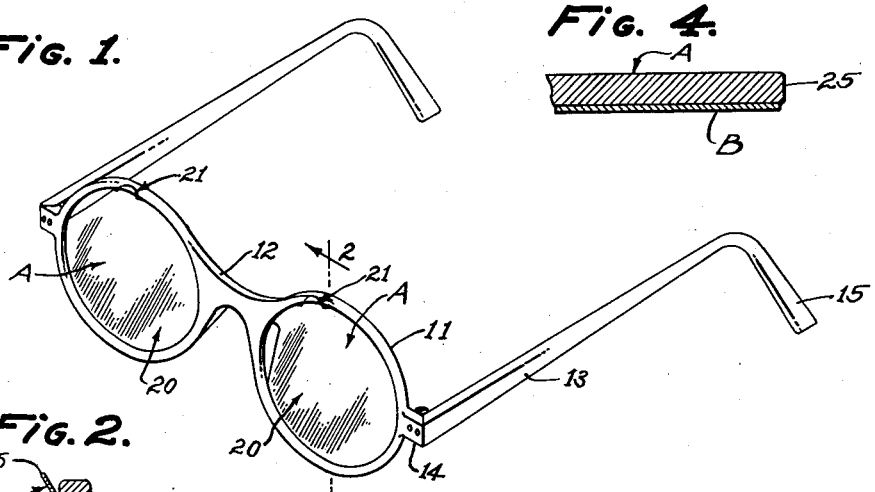
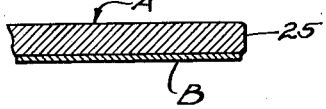
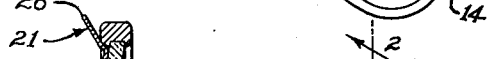
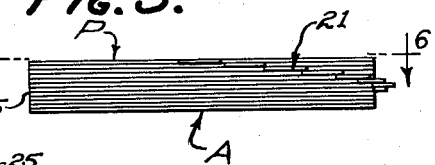
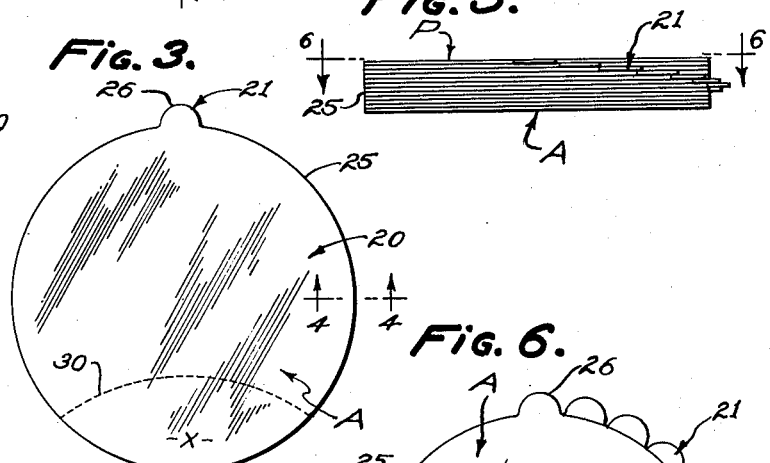
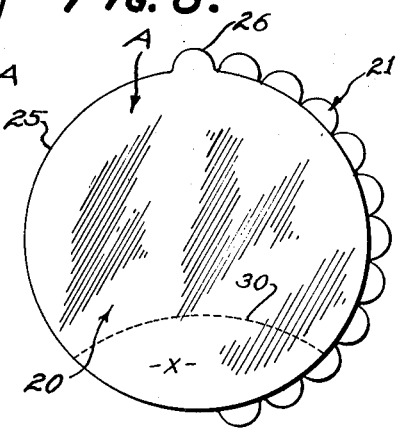
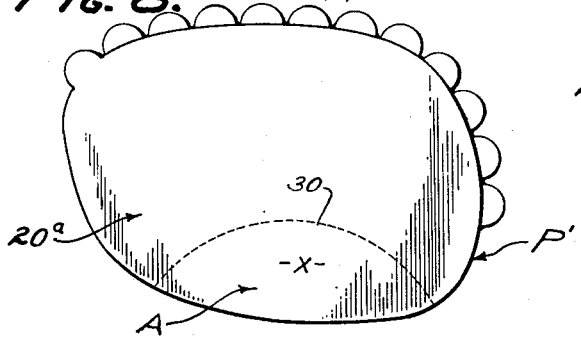
Inventor
Edward Craig
By
Attorney Patented June 13, 1950

2,511,329

UNITED STATES PATENT OFFICE 2,511,329

LENS SHIELD

Edward Craig, Brea, Calif.

Application December 26, 1946, Serial No. 718,574

3 Claims. (Cl. 88—41)

This invention relates to a lens shield and is more specifically concerned with a shield for the lens or lenses of spectacles it being a general object of the invention to provide a simple, inexpensive and convenient shield applicable to a lens of the character referred to to cut down glare or undesirable rays of light such as are ordinarily passed by a spectacle lens.

To overcome various difficulties some people employ two different spectacles, one with clear lenses for ordinary or average use and the other with tinted lenses for use in sunlight. Further, an attempt has been made to afford protection under circumstances above outlined by providing filter glass covers equipped with frames having clamp devices by which they are mounted. However, these devices are usually impractical as they are heavy and more or less inconvenient and cumbersome to operate.

It is a general object of my invention to provide a lens shield or cover which is exceedingly simple in form and construction and which is likewise simple to use. By my present invention I provide a lens cover in the nature of a thin sheet or film that can be easily and quickly stuck to a spectacle lens when desired for use and which can be likewise easily and quickly removed when no longer required or desired.

A further object of the present invention is to provide a lens shield of the general character referred to which is formed of a material and is so attached to a lens as to effectively reinforce and strengthen the lens minimizing the danger of the lens shattering in the event it is struck. The shield that I have provided serves not only as an effective light filter cutting down glare but also acts as a most effective bond between the various portions of the lens preventing the lens from shattering in the manner characteristic of glass.

A further object of the present invention is to provide a pack of lens shields of the type hereinabove referred to which pack is simple and compact in form making it simple and easy to carry and handle. The pack that I have provided is such that the covers or shields can be conveniently removed one at a time as they are desired for use.

The various objects and features of my invention will be fully understood from the following detailed description of typical preferred forms and applications of the invention, throughout which description reference is made to the accompanying drawings, in which:

Fig. 1 is a perspective view of spectacles, or a pair of spectacles as such device is sometimes called, showing a lens shield or cover of the present invention in operating position on each lens. Fig. 2 is an enlarged sectional view taken as indicated by line 2—2 on Fig. 1. Fig. 3 is a plan view of a lens shield or cover provided by the present invention. Fig. 4 is an enlarged sectional view of a portion of the shield being a view taken as indicated by line 4—4 on Fig. 3. Fig. 5 is a side elevation of a pack of lens covers embodying the present invention. Fig. 6 is a plan view of the pack shown in Fig. 5 being a view taken as indicated by line 6—6 on Fig. 5. Fig. 7 is a view similar to Fig. 5 showing another form of pack embodying the present invention and Fig. 8 is a view similar to Fig. 6 being a plan view of another form of shield.

My present invention is primarily concerned with a lens shield or cover, per se, and with a pack of such covers, the cover that I provide being specifically provided for use on or in connection with a spectacle lens. Since ordinary spectacles commonly involve two lenses, two shields will in most cases be employed simultaneously one on each lens. In the drawings I have illustrated typical spectacles in which the lenses 10 are carried in frames 11 joined by a bridge or nose piece 12. Sides or temples 13 are hinged to shoulders 14 of the frames and in the particular case illustrated bows 15 are provided on the sides.

The lens cover or shield of the present invention involves primarily a sheet A of thin flexible transparent material and a film B of adhesive on one side of the sheet. In carrying out my invention I preferably form the sheet A of a thin or paper like sheet of tough and preferably somewhat elastic transparent material such as a suitable plastic. In practice I may employ material commonly known as "cellophane" as such material has the general characteristics that I desire and is inexpensive and readily available.

The sheet A has two parts, a body 20 and a tab 21. I form the body so that it corresponds in plan configuration with the plan configuration of the lens on which it is to be used and I preferably make it of substantially the same size as such lens. When the shield is to be used on a round lens such as is shown on Fig. 1 of the drawings the body 20 is made round in plan configuration as shown in Fig. 3. In practice, however, spectacles lenses are often other than round in plan configuration and therefore I contemplate making the body of any suitable shape. In Fig. 8 I show a body 20ª having a plan configuration such as to fit a particular lens. It is to be understood, that I contemplate making the body of the cover or shield of any desired size or shape as circumstances may require.

The sheet A of the cover or shield is preferably a single integral body of material free of joints, seams or other such structural features or complications. In the drawings I show a preferred form of my invention wherein the body and tab of each sheet A are integrally joined parts, the tab 21 being an integral portion extending radially from the outer edge or periphery 25 of the body. The tab 21 is provided as a grip or handle to facilitate handling of the shield and in practice I shape proportion it to most effectively serve this purpose. The tab may be of limited extent circumferentially of the body and may be such as to project radially from the body only far enough to present a part to be gripped by the fingers of the user. The particular tab illustrated is of limited size and has a round edge 26 whereas it is to be understood that in practice it may be of any suitable size and shape.

The shield that I provide is intended primarily as a light filtering element so that when it is applied to a lens it serves to cut out or to cut down light glare or undesirable rays of light such as are ordinarily objectionable or annoying. To give the shield the desired light filtering action I may tint the sheet A with a suitable dye, say for instance, an aniline dye. When I refer to the shield or to the body of the shield as being tinted I refer to it as being of such character as to have the desired light filtering action.

The adhesive B that I employ is preferably a thin film of suitable adhesive fixed to one side of the sheet A and preferably confined to the body portion of the sheet. The adhesive is applied only to the inner side of the body, that is, to the side of the body to be arranged adjacent the lens. In practice I prefer to employ an adhesive which remains moist or "tacky" and which is such as to remain bonded with the surface of the sheet A to which it is applied while being such as to completely free itself from a surface such as the surface of a lens when its supporting body is removed or peeled therefrom. In practice I prefer to employ a pressure sensitive adhesive such as is used on "Scotch tape," or the like, since such adhesive remains soft and active over a long period of time, will remain confined to the surface to which it is intentionally fixed, will effectively and securely adhere to a smooth surface such as glass and will release from such surface leaving the surface clear and clean.

In carrying out my invention I provide a plurality of lens covers such as I have described above in a group or pack P in which pack the bodies of the covers are stacked one on top of the other preferably in register but in different rotative positions so that the tabs are circumferentially spaced. In Fig. 5 I show a pack P of shields such as are shown in Fig. 3 with the several shields arranged with their bodies 20 directly engaged one over the other so that the adhesive on the inner side of one body joins that body to the other or outer side of the next lower shield. Through this arrangement I employ the adhesive B on the shields as a means of joining the several shields into a pack or unit which is simple in form and very convenient to handle. By arranging the bodies so that the tabs occur at different points circumferential of the pack I provide a pack of shields wherein either of the end shields is always readily accessible for removal from the pack since each tab projects independently and freely from the edge of the pack so it can be conveniently engaged by the fingers of the user.

In Fig. 7 of the drawings I illustrate a pack P' of shields wherein the individual shields instead of being plain or flat as shown in Fig. 5 are concavo-convex and are stacked in nested relation. If the sheet employed in forming the bodies is of material that will not yield or stretch somewhat and the lens on which the shield is to be used has substantial curvature it may be desirable to preform the body of the shield to have substantially the same shape or crowned contour as the lens. When preformed or concavo-convex shields are employed they may be nested together into a simple pack as shown in Fig. 7 with their tabs circumferentially spaced to be individually engageable.

In practice either form of the shield may be used under conditions making it desirable to have only a portion of the lens covered. For example, in the case of a bifocal lens it may be desirable to leave the lower portion of the lens uncovered. In the drawings I show the body weakened or scored along a line 30 so that a part or area X of the body can be readily torn off and discarded as desired.

Having described only typical preferred forms and applications of my invention I do not wish to be limited or restricted to the specific details herein set forth, but wish to reserve to myself any variations for modifications that may appear to those skilled in the art and fall within the scope of the following claims:

Having described my invention, I claim:

1. A cover for a spectacle lens including, a thin flat sheet of tinted transparent material substantially the size and shape of a lens, and an adhesive on one side of the sheet, the sheet being weakened along a line establishing an area that can be removed at will.

2. A cover for a spectacle lens including, a sheet adapted for stacked relation with other like sheets and having a thin transparent tinted body the plan configuration of which is substantially the same as that of the lens and having a tab projecting from the periphery of the body in the plane thereof, and a pressure sensitive adhesive on one surface only of the body, the body being weakened along a line establishing an area that can be removed at will to leave a lens carrying the body with a usable portion covered by the body and with a usable portion that is uncovered, the tab being engageable by the fingers of the user to facilitate removal of the sheet from a stack of like sheets, application of the body to a lens and removal of the body from a lens.

3. A cover for a spectacle lens including, a sheet adapted for stacked relation with other like sheets and having a thin transparent tinted body portion free of markings and having a tab portion projecting from the periphery of the body portion in the plane thereof, the plan configuration of the body portion being substantially the same as that of the lens, and a pressure sensitive adhesive on one surface only of the body portion, the tab being engageable by the fingers of the user to facilitate removal of the sheet from a stack of like sheets, application of the body to a lens and removal of the body from a lens.

EDWARD CRAIG.

REFERENCES CITED

The following references are of record in the file of this patent:

UNITED STATES PATENTS

| Number | Name | Date |
|---|---|---|
| 1,335,517 | Mayerle | Mar. 30, 1920 |
| 1,452,909 | Covelle | Apr. 24, 1923 |
| 1,545,978 | Rollins | July 14, 1925 |
| 1,630,193 | Mallory | May 24, 1927 |
| 1,805,396 | Havens | May 12, 1931 |
| 1,942,287 | Heitz | Jan. 2, 1934 |
| 1,989,371 | Land | Jan. 29, 1935 |
| 2,031,045 | Land | Feb. 18, 1936 |
| 2,046,924 | Pendergast | July 7, 1936 |
| 2,158,129 | Land | May 16, 1939 |
| 2,190,582 | Wolf | Feb. 13, 1940 |
| 2,248,317 | Van Cleef | July 8, 1941 |
| 2,391,539 | Avery | Dec. 25, 1945 |
| 2,413,193 | Robblee | Dec. 24, 1946 |

FOREIGN PATENTS

| Number | Country | Date |
|---|---|---|
| 314,744 | Great Britain | July 4, 1929 |

OTHER REFERENCES

Bornemann (APC publication) Ser. No. 382,255, April 2, 1943 (abandoned).